United States Patent
Toscano et al.

(10) Patent No.: US 8,918,350 B2
(45) Date of Patent: Dec. 23, 2014

(54) METHOD AND APPARATUS FOR ROUTING DATA

(75) Inventors: Orazio Toscano, Genoa (IT); Sergio Lanzone, Genoa (IT); Stefano Deprati, Genoa (IT)

(73) Assignee: Optis Wireless Technology, LLC, Plano, TX (US)

( * ) Notice: Subject to any disclaimer, the term of this patent is extended or adjusted under 35 U.S.C. 154(b) by 555 days.

(21) Appl. No.: 13/140,014

(22) PCT Filed: Dec. 19, 2008

(86) PCT No.: PCT/EP2008/068030
§ 371 (c)(1),
(2), (4) Date: Sep. 2, 2011

(87) PCT Pub. No.: WO2010/069395
PCT Pub. Date: Jun. 24, 2010

(65) Prior Publication Data
US 2011/0313961 A1   Dec. 22, 2011

(51) Int. Cl.
*G06F 15/18* (2006.01)
*G06N 3/02* (2006.01)
*G06N 5/02* (2006.01)
*H04L 12/751* (2013.01)
*H04L 12/747* (2013.01)

(52) U.S. Cl.
CPC ............. *H04L 45/742* (2013.01); *H04L 45/08* (2013.01)
USPC .................... 706/14; 706/15; 706/16; 706/48

(58) Field of Classification Search
USPC ......................................................... 706/14
See application file for complete search history.

(56) References Cited

U.S. PATENT DOCUMENTS 6,876,655 B1 * 4/2005 Afek et al. .................... 370/392

OTHER PUBLICATIONS

Plagianakos et al., Global Search Methods for Neural Network Training [online], 1999 [retrieved on Sep. 11, 2013]. Retrieved from the Internet:<URL:http://www.dcs.bbk.ac.uk/~gmagoulas/365.pdf>.*
Mahramian et al., Three New Neural Network Based Algorithms for IP Lookup and Packet Classification [online], 2005 [retrieved on May 14, 2014]. Retrieved from the Internet:<URL:https://www.google.com/url?q=http://www.shirazu.ac.ir/en/files/extract_file.php%3Ffile_id%3D139&sa=U&ei=2vRzU6q0KOrhsATiqYKwAw&ved=0CEQQFjAH&>.*
Andrei, A Survey on Network Routing and Reinforcement Learning [online], 2000 [retrieved on May 14, 2014]. Retrieved from the Internet:<URL:http://www.math.tau.ac.il/~mansour/rl-course/student_proj/asuciu/network1.htm>.*
PCT International Search Report, mailed Sep. 16, 2009, in connection with International Application No. PCT/EP2008/068030.

* cited by examiner

*Primary Examiner* — Jeffrey A Gaffin
*Assistant Examiner* — Nathan Brown, Jr.
(74) *Attorney, Agent, or Firm* — Vincent J. Allen; James H. Ortega; Carstens & Cahoon, LLP

(57) ABSTRACT

A method of routing data through a router in a communications network, the method comprising receiving one or more data packets, each packet having a respective destination address and applying a lookup algorithm to each packet, said lookup algorithm being arranged to determine a respective route along which each packet is to be transmitted towards its destination address by searching an associated hierarchical data structure containing routing information for each packet. The method comprising forwarding each packet for transmission to its respective destination address, wherein said lookup algorithm comprises an adaptive learning component that is configured to dynamically identify an optimum starting position for searching within said hierarchical data structure, for each of the data packets, based on the results of one or more earlier searches.

18 Claims, 5 Drawing Sheets

METHOD AND APPARATUS FOR ROUTING DATA

TECHNICAL FIELD

The invention relates to a method and apparatus for routing data through a communications network.

BACKGROUND

Network communications commonly make use of packet switching techniques to route data over a shared network. The principle of "packet switching" generally involves dividing data traffic into individual segments, or packets, and assigning a destination address to each packet. The packets are then directed (e.g. routed or switched) through the network according to the packet's destination address by way of a router.

Routing data through a network typically involves forwarding packets between connected network hosts, connected resources or other connected networks. There are several commonly used networking protocols which are used to manage the routing of the data, example protocols include: Ethernet, Multi-protocol Label Switching (MPLS), Asynchronous Transfer Mode (ATM) and Internet Protocol (IP). It is to understood that the term "routing" is used herein to relate to the forwarding and transmission of data packets on any type of communications network and therefore is intended to include at least both Switched (Ethernet) and Routed (IP) Networks. Moreover, any references to a "router" are to be taken to include both IP routers and Ethernet Switches, and thus the routing of packets by way of such devices is to be construed accordingly.

Most routers forward packets by applying a lookup mechanism, typically a lookup algorithm, to each received packet in order to determine the routing information for that packet based on its destination address. The routing information is generally maintained within a searchable data structure, which contains information about each of the hosts, resources and other networks connected to the communications network. In Ethernet-based networks, Ethernet Switches perform routing by implementing lookup algorithms that usually make use of "exact match" searches.

There are four main techniques in the prior art for achieving an exact match search, and consequently exact match lookup algorithms are usually based on one of the following: (1) Direct Lookup, (2) Associative Lookup, (3) Hashing and (4) Binary Search.

Although Direct Lookup techniques may be successfully used in conjunction with MPLS or ATM packet switching, it is generally not possible to use this technique with Ethernet Switching as the destination address (i.e. the MAC-destination address) is 48-bits in length. In practice, this means that the searchable data structure cannot hold all the addresses, as the dimension of the structure is usually much smaller than $2^{48}$.

Associative Lookup is based on associative memory, also commonly referred to as "Content Addressable Memory" (CAM), that compares all stored addresses to the destination address of the received packet. The comparison involves searching every memory location in parallel until a match is found, whereupon the address of the location that contains the required information is returned. Associative memory has a low latency (typically comparable to SRAM), while providing an increased search speed (due to a lower number of required memory accesses). However, despite its advantages CAM has a very low density compared to both DRAM and SRAM, and the cost per bit is generally quite expensive in comparison to other memory types. Moreover, due to the parallel operation of the CAM, the power dissipation is found to be quite high compared to conventional RAM, and therefore its use is found to be less suitable for cost-sensitive applications.

A lookup algorithm based on Hashing involves mapping a 48-bit destination address into an n-bit address, where n<<48 (e.g. n=16). The data structure may then be searched linearly (or possibly via a binary search—see below) in order to locate the required information for routing the packet. Although the Hashing technique is simple to implement, it is necessary to manage collisions between conflicting hashed destination addresses, with the resulting lookup being non-deterministic, i.e. the technique gives rise to an unpredictable number of memory accesses.

The Binary Search technique requires the use of a searchable data structure having the form of a binary search tree. The lookup algorithm locates routing information within the structure by carrying out a binary search, which begins by comparing a packet's destination address (i.e. input key) against the address corresponding to the root of the tree.

Depending on the result of the comparison, the binary search proceeds to select a branch in the tree leading to the next address (corresponding to a node within the tree) that is to be compared to the input key. The process continues by descending through subsequent branches and carrying out corresponding comparisons until the required information is found. Despite binary search trees having update and scalability drawbacks, such structures are known to be very storage-efficient, while being simple to implement and search. Moreover, the height of a binary search tree (i.e. as gauged by the number of different branched levels between the root and lowest nodes) may be readily reduced by simply rearranging the structure of the tree.

The simple structure of a binary search tree enables searching to be deterministic, and therefore the number of required memory accesses may be known beforehand or estimated with a high degree of reliability, in contrast to searches carried out by Hashing lookup algorithms. As a result, most lookup algorithms used in present-day data routing are based on binary searches, but their principle drawback is the relatively poor scalability in terms of their search (lookup) speed, as increasingly larger structures take more time to search.

SUMMARY

It is an object to provide an improved method of routing data through a communications network by optimising the routing lookup mechanism. It is a further object to provide an improved router.

According to a first aspect of the invention there is provided a method of routing data through a router in a communications network. In the method, a router receives one or more data packets, each having a respective destination address. To determine a respective route along which each packet is to be transmitted towards its destination address, a lookup algorithm is applied to each of the packets, which searches an associated hierarchical data structure containing routing information for each of the packets. The lookup algorithm comprises an adaptive learning component that is configured to dynamically identify an optimum starting position for searching within the hierarchical data structure, for each of the data packets, based on the results of one or more earlier searches. Following a search, each packet is forwarded for transmission to its respective destination address.

The method enables the lookup algorithm to adaptively learn the approximate locations of the routing information by way of the adaptive learning component, so that it is able to optimise the position at which a lookup search is to be commenced within the hierarchical data structure for each received packet based on the results of past searches. In this way, over time, the lookup algorithm is able to improve the efficiency of the search and to correspondingly lower the overall search speed.

The benefit of optimising the starting position for searching within the hierarchical data structure is to enable a lookup search to be commenced at a location within the structure that is closer to the location at which the required information is stored. As a result, the speed of the searching procedure is therefore significantly improved, while allowing the number of required memory accesses to be reduced.

The adaptive learning component may be configured to evaluate a search error associated with the result of each lookup search. The search error is an indicator of the accuracy of the lookup search in relation to a particular input destination address and therefore reveals how close the optimum starting position was to the location of the required routing information. Evaluating the search error associated with each search result thereby provides a measurable parameter with which to assess the performance and efficiency of the lookup algorithm, while also enabling the adaptive learning component to be updated.

The adaptive learning component may be an artificial neural network. The use of an artificial neural network provides the lookup algorithm with the functionality to learn from its historical performance, which enables the algorithm to optimise the starting positions for searching within the hierarchical data structure based on past searches. The artificial neural network may be configured to evaluate the search error associated with each lookup search and to dynamically update one or more weights within the artificial neural network.

Updating one or more weights within the artificial neural network allows the network to adapt its internal structure, based on a knowledge of its previous performance, so that it may learn how to optimise subsequent starting positions for searching within the hierarchical data structure. Modifying weights within an artificial neural network allows the network to assign greater importance to a given input or inputs, and therefore the use of an artificial neural network is found to be particularly advantageous in identifying the best starting position for a specific input destination address.

Evaluating the search error and updating the one or more weights enables the artificial neural network to learn the approximate location at which a particular routing information is to be found within the hierarchical data structure. In this way, the starting position at which a lookup search is to be commenced may be optimised by identifying a position that is relatively close to the location at which the required information is stored. The search error may be evaluated by minimising a weight-dependent error function, or alternatively via some other form of mathematical evaluation technique that allows the neural network to learn from the previous searches.

The hierarchical data structure may be a binary search tree. The routing information may be stored within the nodes of the binary search tree, thereby allowing the information to be searched by way of a deterministic binary search. In embodiments in which the adaptive learning component is an artificial neural network, the network may estimate, for each packet, the best starting root within the tree at which to commence a binary search for a particular routing information, based on the evaluated search errors and the one or more weights within the artificial neural network.

The best starting root may be estimated by identifying a root within the binary search tree that is relatively close to the location at which a particular routing information is expected to be found, in order to thereby minimise the number of steps required when searching the tree. In this way, the number of memory accesses can be consequently reduced.

The artificial neural network may be arranged to compare each search result to the corresponding estimated starting root to evaluate the neural network error and to update the one or more weights within the neural network. Evaluating the search errors and updating the one or more weights may be performed according to a supervised learning mode. However, other learning models such as unsupervised learning or reinforcement learning may alternatively be used in some embodiments.

The search errors may be evaluated by way of a backpropagated method implemented within the supervised learning mode to update the one or more weights within the artificial neural network.

According to a second aspect of the invention there is provided a router comprising at least one input port, at least one output port, a memory and a processor. The processor is arranged to receive one or more data packets via the input port, each packet having a respective destination address. The processor is also arranged to apply a lookup algorithm to each packet to determine a respective route along which each packet is to be transmitted towards its destination address. The lookup algorithm searches an associated hierarchical data structure containing routing information for each packet. The lookup algorithm comprises an adaptive learning component that is configured to dynamically identify an optimum starting position for searching within said hierarchical data structure, for each of the data packets, based on the results of one or more earlier searches. The processor is further arranged to forward each packet for transmission to its respective destination address via the at least one output port.

Embodiments of the invention will now be described in detail, by way of example only, with reference to the accompanying drawings.

DETAILED DESCRIPTION

Figure 1:
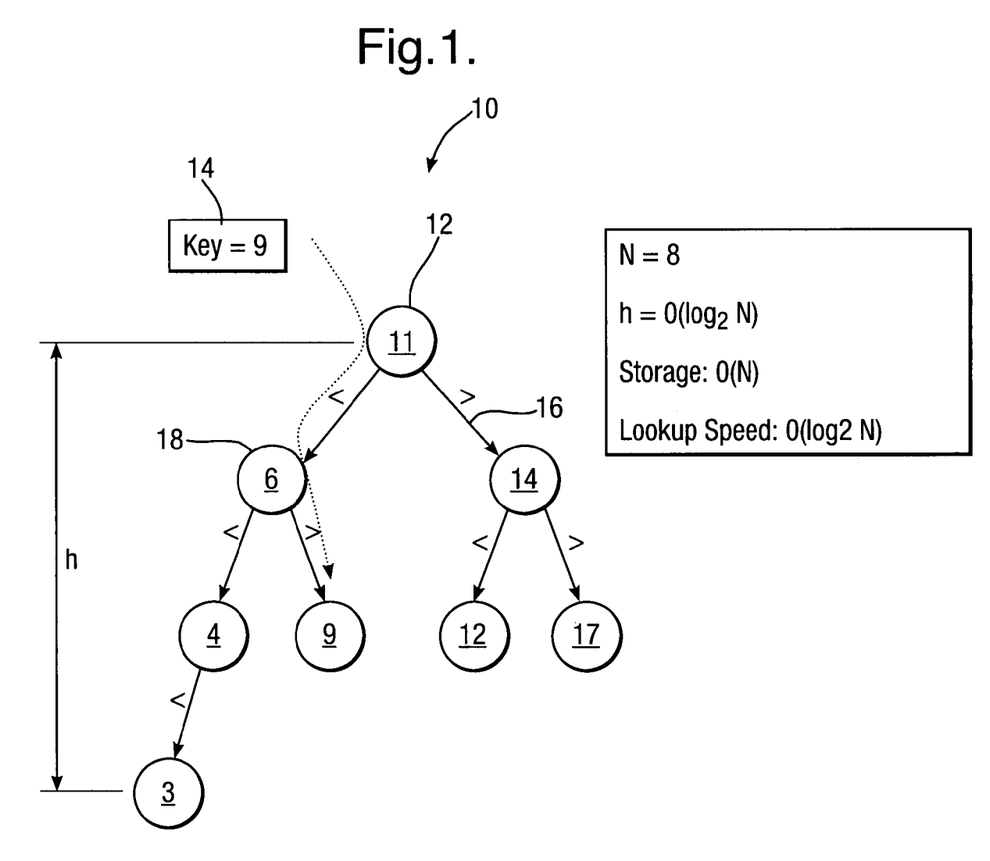
FIG. 1 is a schematic representation of a binary search tree.

Referring to FIG. 1, there is shown a schematic representation of an example binary tree data structure 10 having N=8 nodes (of which only one is labelled 18 for clarity of presentation) arranged in a tree of height $h=O(\log_2 N)$. The storage capacity of the tree is $O(N)$ and the lookup speed scales as $O(\log_2 N)$. One of the nodes corresponds to the root 12 of the tree, which in the example of FIG. 1 has a value of 11.

Figure 7:
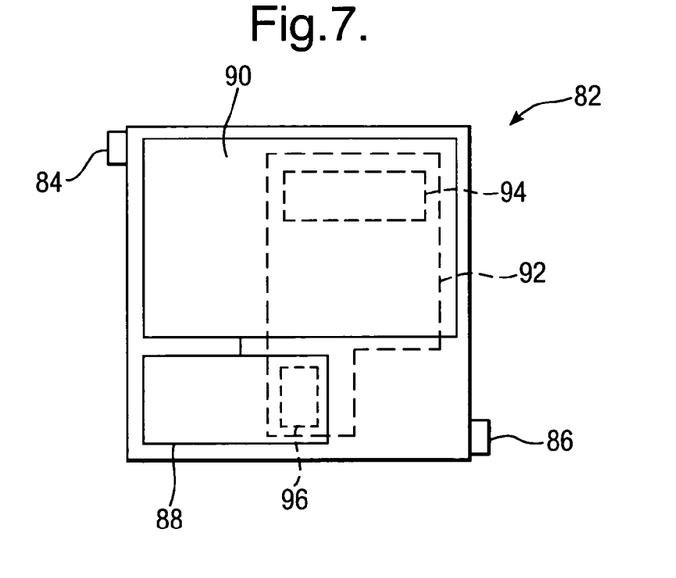
FIG. 7 is a schematic representation of a router according to an embodiment of the second aspect of the invention.

In routing lookup applications, the binary search tree 10 would be implemented as a data structure within the memory 88 of a router 82 (as shown in FIG. 7). The nodes 18 of the binary search tree 10 would have values corresponding to destination addresses within the communications network, with each address being associated in memory with a related routing information to enable each packet to be forwarded for transmission towards its destination.

To locate information within a binary search tree 10, an input key 14 is applied to the tree by comparing the value of the key 14 to the root 12 of the tree. In the example of FIG. 1, the key 14 has a value of 9 and therefore to locate the corresponding information it is necessary to search for the node that has the same value as the input key 14. Again in routing applications, the input key 14 would correspond to the destination address of the packet that is to be routed, and so by locating the node with the same value as the input destination address it is possible to determine the information required to forward the packet for transmission through the network.

It is to be appreciated in respect of this invention, that any particular routing information within a binary search tree may provide all the necessary information for forwarding and transmitting a packet to its final destination in the network, or else may only provide sufficient information for forwarding the packet onto the next router or next connected segment of the network etc. and hence the packet may require additional routing information for subsequent forwarding and transmission before it reaches its final destination.

The input key 14 is compared to the root 12 of the binary search tree 10. In accordance with binary search paradigms, if the value of the key 14 is equal to the root 12 the search ends at that first step and the required information is determined. If, however, the value of the input key 14 is less than the value of the root 12, the search descends along the left-hand branch of the tree 10 to the next node 18. It is conventional in binary search paradigms to descend along a left-hand branch if the value of the key is less than the value of the most recently compared node, and to descend along a right-hand branch if the value of the key is greater than the value of the most recently compared node. However, embodiments of the invention may be implemented with the reverse situation being adopted without any difference in the end result of the search.

In the example of FIG. 1, the input key 14 has a value of 9, which is less than the value of the root 12 (i.e. <11) and consequently, the search proceeds by descending the left-hand branch associated with the root 12 (shown by the dotted arrowed line). The next node has a value of 6, which is less than the value of the key (i.e. <9) and so the search continues by descending the right-hand branch associated with that node. The next node has a value of 9 and therefore corresponds to the node having the same value as the key 14. As a result, the required information may be easily located, while the number of steps required in the search remains deterministic.

However, despite the ease of implementation and simplicity of searching binary tree structures, they do suffer from a disadvantage that they are not readily scalable. Hence, as the height of the tree increases, so too does the lookup speed, which scales as $O(\log_2 N)$. Therefore, the processing time, and number of memory accesses required for each search, can become quite prohibitive when very large tree structures are used. As a result, the performance of a router may be diminished and the overall latency within the network may increase, possibly leading to reduced throughput and communication delays.

Figure 2:
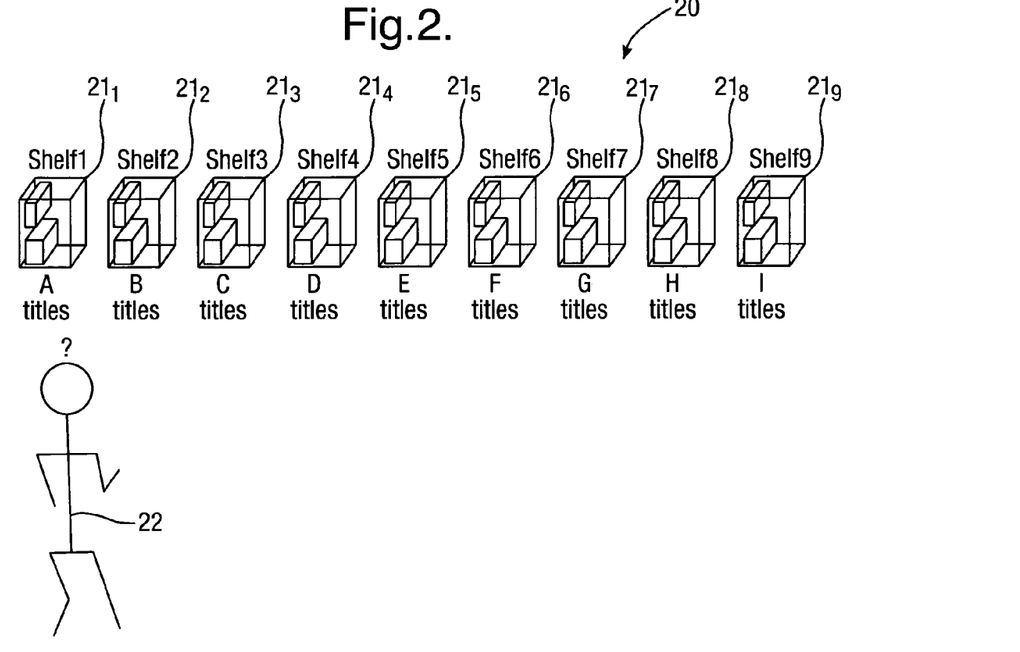
FIGS. 2 & 3 are schematic representations illustrating the application of a binary search within a library-based example.
Figure 3:
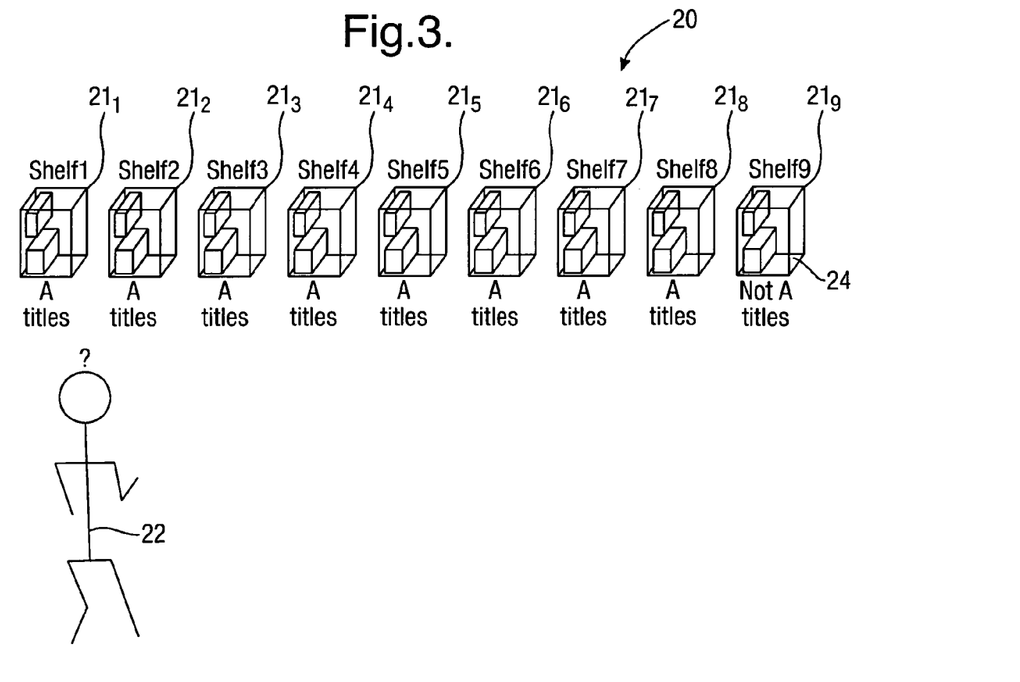

FIGS. 2 and 3 illustrate, by way of an artificial example, the poor scalability of conventional binary search techniques. In FIG. 2, there is shown a library 20 comprising nine rooms $21_1 \ldots 21_9$, each room having one shelf. The shelves are labelled as 'Shelf 1' through to 'Shelf 9' respectively. Shelf 1 contains only books having titles beginning with the letter 'A', Shelf 2 has books with titles beginning with the letter 'B' and so on up to Shelf 9 with book titles beginning with the letter 'I'.

In conventional binary search paradigms, the mean value of the set of values is usually selected as the tree root in order to obtain a balanced tree. Therefore, in this example, the room with Shelf 5 (i.e. room $21_5$) is selected to be the tree root for each and every search. A librarian 22 wanting to locate a book beginning with a particular title, will commence his search at room $21_5$ and depending on the result of the comparison, will either move to rooms $\{21_1, 21_2, 21_3, 21_4\}$ or rooms $\{21_6, 21_7, 21_8, 21_9\}$ thereby repeating the process until the book is found. Even if the librarian 22 is asked over and over again to find books with titles beginning with the letter 'I', he will always commence his search at room $21_5$, and then proceed to move to room $21_9$ after a predetermined number of steps.

This problem may be further emphasised by the example shown in FIG. 3. In this case, the shelves are arranged such that 'Shelf 1' through to 'Shelf 8' only contain books with titles beginning with the letter 'A' and all other books, i.e. with titles not beginning with the letter 'A' are on Shelf 9 in room $21_9$. In a real-life situation, the librarian 22 would quickly learn and remember that all the non-'A' titled books where located in room $21_9$, so any requests for such books would lead him to room $21_9$ as the starting point for his search. However, in a conventional binary search, the librarian 22 would start every search at room $21_5$, regardless of whether the requested title did not begin with the letter 'A'. This is because binary search paradigms have no knowledge of the location of information within the binary search tree.

Hence, as the above examples help to illustrate, existing lookup algorithms based on binary search paradigms are inherently inefficient, as the searching process commences at the same location irrespective of the input conditions. Therefore, no matter what destination address is sought, the same starting position (i.e. tree root) is selected at which to commence the search, even if the algorithm has previously routed a packet to the same destination address.

Figure 4:
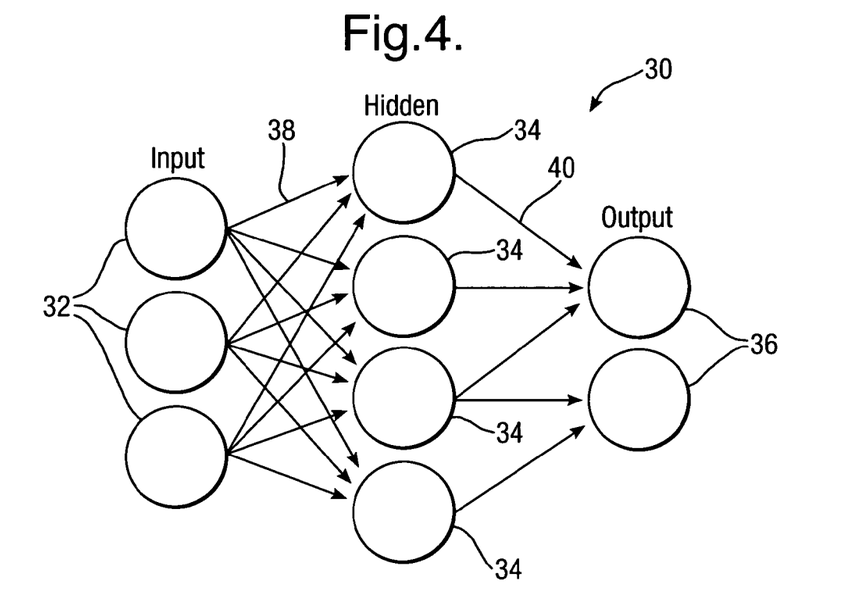
FIG. 4 is a schematic representation of a neural network.

In embodiments of the invention, this problem is addressed by providing a lookup algorithm with an adaptive learning component in the form of an artificial neural network 30 (see FIG. 4). The artificial neural network 30 acts as a first (e.g. precursor) stage to the second stage of searching a binary tree data structure. The function of the artificial neural network 30 is to learn the approximate locations of the information within the binary search tree 10 in order to optimise the starting positions for each search. In this way, each lookup search may then be optimised by commencing the search at a location that is closer to the required routing information, which thereby reduces the number of search steps and hence increases the search speed by lowering the required number of memory accesses.

The artificial neural network 30 learns how to improve each search by evaluating the errors associated with the results of previous lookup searches and hence is able to identify the best starting position at which to commence subsequent lookup searches. The learning capability of the artificial neural network therefore allows the lookup algorithm to maintain a dynamic knowledge of the current searching state based on a knowledge of previous searches and its past performance.

Before proceeding to discuss embodiments of the method of the invention in more detail, it will be useful to provide a brief summary of the properties and functionality of an artificial neural network to facilitate understanding of the invention.

Figure 5:
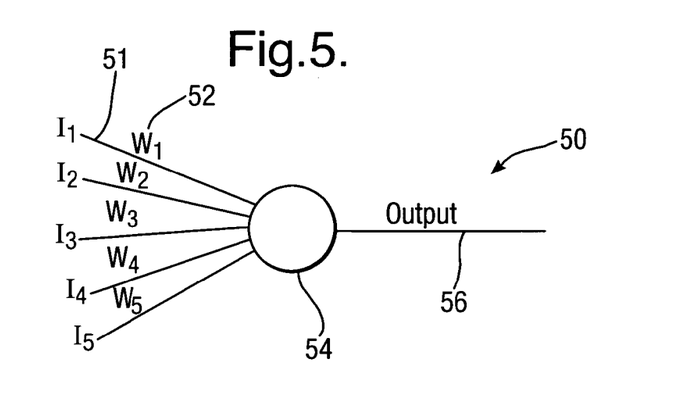
FIG. 5 is a schematic representation of an artificial neuron model.

Referring now to FIGS. 4 & 5, there is shown a simplified view of an artificial neural network 30 and a simplified neuron model 50, respectively. An artificial neural network, also commonly referred to as a "simulated neural network" or simply a "neural network", is typically an interconnected group of artificial neurons 54 that uses a mathematical or computational model for processing information according to a connectionist computational approach. In a computational sense, artificial neural networks are therefore non-linear statistical data modelling or decision-making tools, which can be used to model complex relationships between inputs and outputs or to determine patterns in data.

However, it is to be understood that in the invention any reference to an "artificial neural network" is to be taken to include any type of adaptive system or processing device that is operable to change its structure based on external or internal information that flows the system.

The artificial neurons 54 correspond to individual processing elements, which are able to exhibit complex global behaviour as determined by the connections between the elements and one or more parameters associated with the elements (discussed below). An artificial neural network 30 is usually composed of three stages, as shown in FIG. 4. The first stage is an input stage 32 whereby each neuron 54 receives one or more ingresses or input signals 51, denoted by $I_1 \ldots I_5$. The second stage is what is commonly referred to as a "Hidden" stage 34. The Hidden stage 34 performs the so-called elaboration of the input signals $I_1 \ldots I_5$, namely, it applies a prescribed computational process to the inputs. The elaboration may be quite complex, depending on the desired output, but in a simplified case it is possible to configure the Hidden stage 34 so that each input signal $I_1 \ldots I_5$ is multiplied by a value referred to as a "weight" 52, denoted in FIG. 5 by $W_1 \ldots W_5$. In this way, each neuron 54 can be arranged so that all the multiplication results are summed $$\left( e.g. \sum_{n=1 \ldots 5} I_n W_n \right)$$

and if the value of the sum exceeds a predefined threshold valve, the neuron 54 will activate its output 56. The third stage is an Output stage 36, which collects the outputs 56, by way of connections 40, and provides the one or more output signals from the artificial neural network 30.

Hence, it is to be appreciated that a weight 52 within the neuron 54 is indicative of the ingress efficacy and consequently the value of the weight 52 can be selected so that any corresponding input signal 51 will have a greater importance over the other input signals. Thus, important ingresses have larger weights. It is this property and ability to update the weights that allows artificial neural networks to adapt to changing conditions and to learn from their previous performance.

Figure 6:
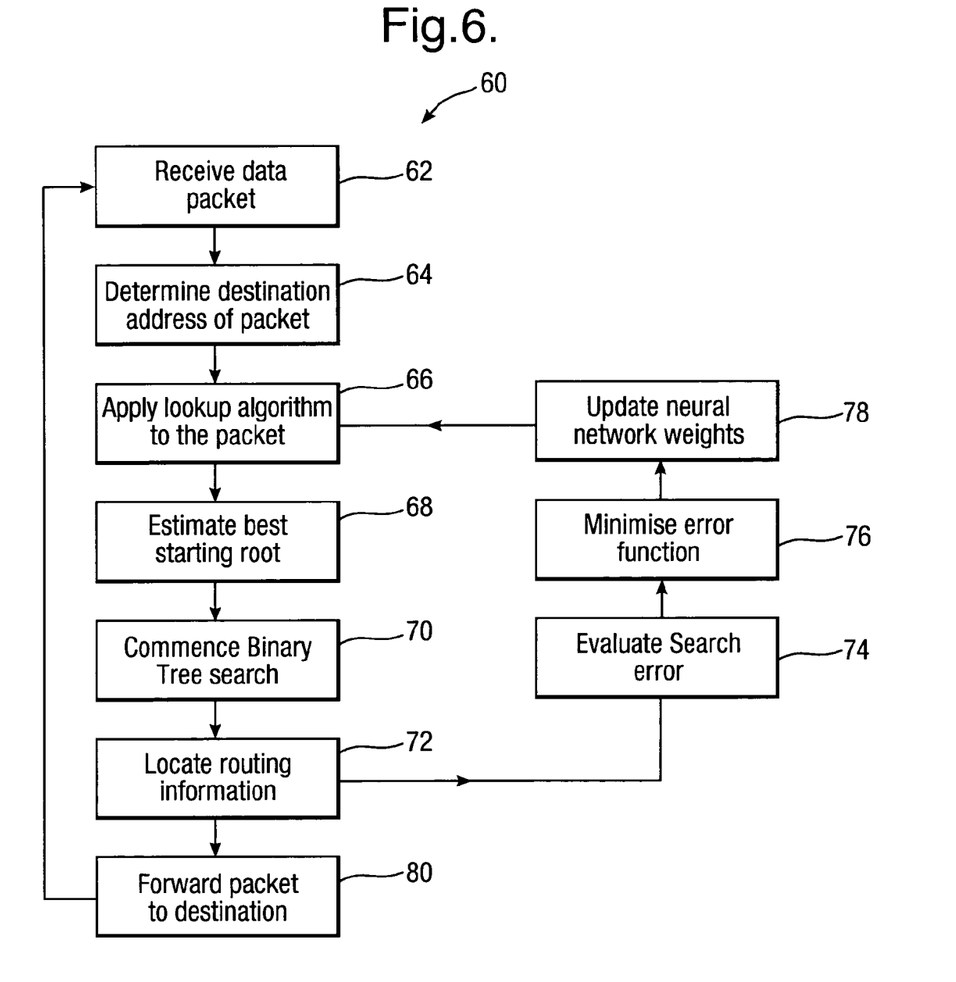
FIG. 6 is a flowchart of a method of routing data through a router in a communications network according to an embodiment of the first aspect of the invention.

Referring now to FIG. 6, there is shown a flowchart 60 of a first embodiment of the method of the invention. Data to be routed through a communications network is received in the form of one or more data packets (step 62). The method determines the destination address of a packet (step 64) by interrogating the packet's header information. In order to forward the packet for transmission towards its destination address, the method applies a lookup algorithm to the packet (step 66) to determine the required routing information. The lookup algorithm comprises two stages, a first stage including an artificial neural network 30 and a second stage configured to apply a binary search to a binary tree data structure 10 containing the routing information.

The artificial neural network 30 processes the input key 14, corresponding to the destination address of the packet, and estimates the best starting root 12 in the tree 10 (step 68) at which to commence the search for the required routing information. If the artificial neural network 30 has not performed any previous searches, it will select the starting root to be the mean value of the set of addresses in order to obtain a balanced tree. In this case, the binary search will then commence (step 70) and the required routing information will be located (step 72) by searching within the binary tree data structure. Once the routing information is found the packet is then forwarded for transmission to its destination address (step 80). Hence, in this initial search, the algorithm will perform in a manner similar to a conventional binary search lookup algorithm.

However, due to the artificial neural network's ability to learn from its previous performance, the artificial neural network 30 assesses and evaluates the error associated with the most recent search (step 74) in order to update one or more weights 52 (step 78) within the neural network. In this embodiment it achieves this by minimising an error function (step 78) of the form:

$$E = \frac{1}{2} \sum_h \sum_k (out_k^h - y_k^h)^2$$

where h is the number of output values from the neural network, k is the number of output neurons, $out_k^h$ is the output value from the neural network and $y_k^h$ is the target value. It is evident that the error function E is functionally dependent on the weights within the neural network, as the output of the network $out_k^h$ is determined by the value of those weights.

In this embodiment, the artificial neural network 30 is implemented according to a supervised learning paradigm, which trains the neural network by minimising the average squared error between the network's output $out_k^h$ and the target value $y_k^h$ by using a gradient descent algorithm. The gradient descent algorithm is selected to be backpropagation algorithm, which is commonly used within the art to minimise error functions within supervised learning paradigms.

The backpropagation algorithm backwardly propagates the search error from the neural network output to the inputs. Put in other words, the backpropagation calculates the gradient of the error of the network with respect to the network's modifiable weights. The gradient may then be used in conjunction with a simple stochastic gradient descent algorithm in order to find the weights that minimise the search error. Mathematically, the backpropagation algorithm starts from a generic point $x_0$ and calculates the gradient of the error $\nabla f(x_0)$. The gradient provides the direction in which to move in order to minimise the error. The gradient is then re-calculated at a new point $x_1$, which is a predefined distance $\delta x$ from the original point. The backpropagation algorithm then continues to repeat the process until the gradient value is found to be zero. In this way, the backpropagation algorithm enables a relatively quick convergence to occur on a local minima for the error.

Once the error function has been minimised (step 76), one or more weights within the neural network 30 can then be updated (step 78) to teach the network how to estimate a better starting position for locating routing information based on a particular destination address. In this way, the artificial neural network begins to learn where to find particular routing information within the binary tree data structure based on its knowledge of previous searches. As a result, it can then select an optimised starting position for each new search, which will reduce the number of required memory accesses and thereby increase the search speed.

The artificial neural network does not need to have, nor develop, a precise knowledge of the locations of every piece of required routing information, as significant speed increases over existing lookup algorithms will still be achieved if it only remembers the approximate locations at which a particular data may be found. This is akin to the earlier example of the librarian 22 in FIG. 3, who need not remember the exact location of each and every book on Shelf 9, but instead can still locate non-'A' titled books very quickly due to his knowledge that the books are stored in room 21$_9$.

Referring again to FIG. 6, once the packet has been forwarded for transmission to its destination address (step 80), the method then proceeds to process the next packet according to steps 62 to 80. It is to be appreciated that the teaching of the artificial neural network may occur as a "background process" while the packet is being forwarded. In other words, the routing of the packet may be performed in parallel with the updating of the neural network weights. In this way, a particular packet may then be forwarded as soon as possible after the lookup search is completed without introducing a delay into the packet path, which thereby avoids introducing any undesired latency into the routing procedure. With each new lookup search, the weights 52 within the artificial neural network are updated by virtue of minimising the error function, which then allows the error to be backwardly propagated to teach the neural network how to estimate the best starting root within the binary tree structure at which to commence subsequent searches for particular destination addresses. The artificial neural network dynamically selects a root that is closer to the approximate location of the required routing information. The meaning of 'closer' in this context being understood to relate to a root position that will result in a reduced number of memory accesses.

The resulting residual uncertainty in the selection of the best starting root is found to be very low and consequently has negligible effect on the improved performance of the lookup algorithm. Moreover, as the updating of the weights within the neural network is dynamic, the lookup algorithm can respond very quickly to any changes in the routing information stored in the binary tree data structure.

The method of the invention is therefore suited for use with large binary tree data structures, as the number of recursive memory accesses can be significantly reduced over conventional lookup algorithms.

Referring now to FIG. 7, there is shown a router 82 according to a second embodiment of the invention. The router 82 comprises an input port 84, an output port 86, a memory 88 and a processor 90. The structure of the router 82 is similar to conventional routers and the router includes a switching fabric (not shown) for performing packet switching according to the Ethernet networking protocol. For clarity of presentation, only one input port and one output port are shown. However, it is to be appreciated in most practical applications the router 82 will include a plurality of input and output ports connected via the switching fabric.

The processor 90 is configured to control the operation of the router 82 and to execute each of the steps of the method in the first embodiment of the invention. The lookup algorithm 92 (shown schematically as ghost lining) is implemented in the router 82 so that it executes on the processor 90, with the algorithm accessing the binary tree data structure 96 (shown as ghost lining) in the memory 88 for locating routing information. The binary tree data structure 96 contains routing information for forwarding of the packets through the communications network (shown in FIG. 8). The memory 88 may be a single memory module of a non-volatile type or alternatively may comprise a plurality of volatile memory chips etc. In each case, part or all of the binary tree data structure 96 may be stored in the memory as required or buffered into memory when the router 82 is turned on, or at the time searching is to take place.

In this embodiment, the artificial neural network 94 (shown schematically as ghost lining) is executed on the processor 90 as part of the lookup algorithm, with the neural network having access to the memory 88 and to the binary tree data structure 96. As packets are routed through the router 82, the lookup algorithm 92 is applied to each packet with the artificial neural network 94 estimating the best starting root for searching within the binary tree data structure in order to locate the required routing information for that packet. Following an evaluation of the search error, the artificial neural network updates one or more weights within the network in order to optimise the starting position of subsequent searches.

Figure 8:
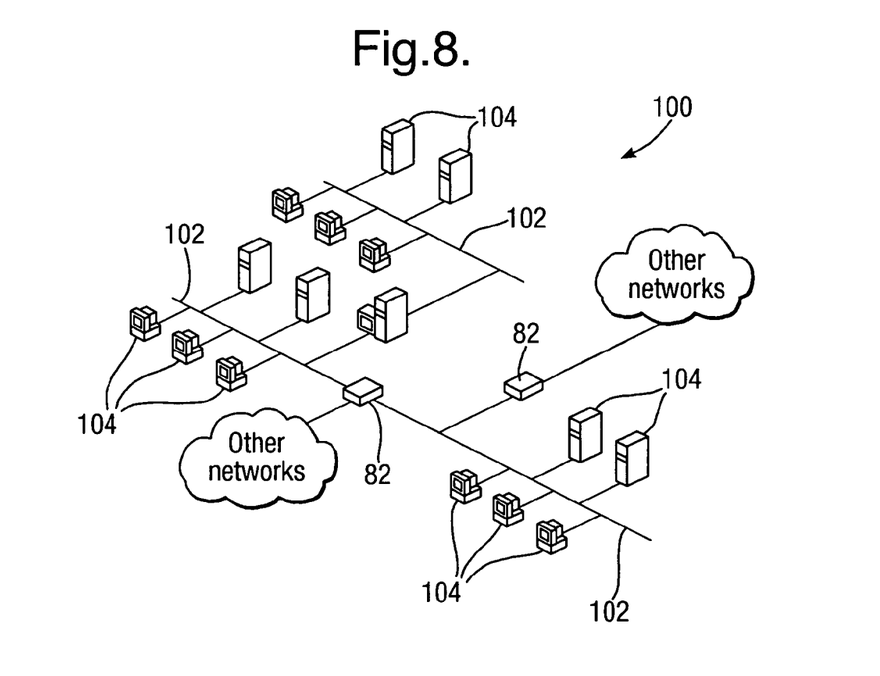
FIG. 8 is a schematic representation of an example communications network comprising at least one router according to an embodiment of the second aspect of the invention.

As shown in FIG. 8, two of the routers 82 of the invention have been implemented into an Ethernet communications network 100, comprising a plurality of computing devices 104 connected by way of a plurality of communications channels 102. The routers 82 are responsible for routing data throughout the communications network 100 by way of the method of the invention. The routers 82 forward the packets for transmission towards their respective destination addresses, which may correspond to one of the computing devices 104 or to another connected communications network or network segment etc.

It is to be appreciated that any number of routers according to the invention may be implemented in any size of communications network for routing data between connected devices and resources. Moreover, the router of the invention may be a standalone device or alternatively, in other embodiments, may be an integral component of another device, such as a server etc. without sacrificing any of the advantages of the invention.

The invention claimed is:

1. A method of routing data through a router in a communications network, the method comprising:
    the router performing:
    receiving one or more data packets, each packet having a respective destination address;
    applying a lookup algorithm to each packet, said lookup algorithm being arranged to determine a respective route along which each packet is to be transmitted towards its destination address by searching an associated hierarchical data structure containing routing information for each packet; and
    forwarding each packet for transmission to its respective destination address,
    wherein said lookup algorithm comprises an adaptive learning component comprising an artificial neural network that is configured to dynamically identify an optimum starting position for searching within said hierarchical data structure, for each of the data packets, based on the results of one or more earlier searches performed by the lookup algorithm of the router by said artificial neural network evaluating search errors associated with each earlier search and dynamically updating one or more weights within said artificial neural network, wherein evaluating said search error and updating said one or more weights enables said artificial neural network to learn the approximate location at which a particular routing information is to be found within said hierarchical data structure.

2. The method as claimed in claim 1, wherein said search error is evaluated by minimising a weight-dependent error function.

3. The method as claimed in claim 1, wherein said hierarchical data structure is a binary search tree.

4. The method as claimed in claim 3, wherein said artificial neural network estimates, for each packet, the best starting root within said tree at which to commence a binary search for a particular routing information, based on said evaluated search errors and said one or more weights within said neural network.

5. The method as claimed in claim 4, wherein estimating the best starting root involves identifying a root within said tree that is close to the location at which a particular routing information is predicted to be found, in order to thereby minimize the number of steps required when searching said tree.

6. The method as claimed in claim 4, wherein said artificial neural network compares each search result to the corresponding estimated starting root to evaluate the neural network error and to update said one or more weights within said neural network.

7. The method as claimed in claim 1, wherein evaluating said search errors and updating said one or more weights is performed according to a supervised learning mode.

8. The method as claimed in claim 7, wherein said search errors are back-propagated in said supervised learning mode to update said one or more weights within said neural network.

9. A router, comprising:
    at least one input port;
    at least one output port;
    a memory; and
    a processor arranged to:
        receive one or more data packets via said at least one input port, each packet having a respective destination address;
        apply a lookup algorithm to each packet, said lookup algorithm being arranged to determine a respective route along which each packet is to be transmitted towards its destination address by searching an associated hierarchical data structure containing routing information for each packet; and
        forward each packet for transmission to its respective destination address via said at least one output port,
    wherein said lookup algorithm comprises an adaptive learning component comprising an artificial neural network that is configured to dynamically identify an optimum starting position for searching within said hierarchical data structure, for each of the data packets, based on the results of one or more earlier searches performed by the lookup algorithm of the router by said artificial neural network evaluating search errors associated with each earlier search and dynamically updating one or more weights within said artificial neural network, and
    wherein evaluating said search error and updating said one or more weights enables said artificial neural network to learn the approximate location at which a particular routing information is to be found within said hierarchical data structure.

10. The router as claimed in claim 9, wherein said search error is evaluated by minimising a weight-dependent error function.

11. The router as claimed in claim 9, wherein said hierarchical data structure is a binary search tree.

12. The method as claimed in claim 9, wherein said artificial neural network estimates, for each packet, the best starting root within said tree at which to commence a binary search for a particular routing information, based on said evaluated search errors and said one or more weights within said neural network.

13. The method as claimed in claim 9, wherein estimating the best starting root involves identifying a root within said tree that is close to the location at which a particular routing information is predicted to be found, in order to thereby minimize the number of steps required when searching said tree.

14. The method as claimed in claim 9, wherein said artificial neural network compares each search result to the corresponding estimated starting root to evaluate the neural network error and to update said one or more weights within said neural network.

15. The method as claimed in claim 9, wherein evaluating said search errors and updating said one or more weights is performed according to a supervised learning mode.

16. The method as claimed in claim 15, wherein said search errors are back-propagated in said supervised learning mode to update said one or more weights within said neural network.

17. A communications network, comprising:
    a plurality of communications channels;
    a plurality of computing devices, each device defining a node within said network that is connected to one or more of said channels; and
    at least one router comprising:
        at least one input port;
        at least one output port;
        a memory; and
        a processor arranged to:
            receive one or more data packets via said at least one input port, each packet having a respective destination address;
            apply a lookup algorithm to each packet, said lookup algorithm being arranged to determine a respective route along which each packet is to be transmitted towards its destination address by searching an associated hierarchical data structure containing routing information for each packet; and
            forward each packet for transmission to its respective destination address via said at least one output port,
        wherein said lookup algorithm comprises an adaptive learning component comprising an artificial neural network that is configured to dynamically identify an optimum starting position for searching within said hierarchical data structure, for each of the data packets, based on the results of one or more earlier searches performed by the lookup algorithm of the processor by said artificial neural network evaluating search errors associated with each earlier search and dynamically updating one or more weights within said artificial neural network,
        wherein evaluating said search error and updating said one or more weights enables said artificial neural network to learn the approximate location at which a particular routing information is to be found within said hierarchical data structure, and
        wherein said at least one router is arranged to route data between one or more of said nodes within said network.

18. A non-transitory data carrier having computer readable instructions embodied therein for routing data through a communications network, the computer readable instructions comprising instructions to cause a processor within a router to perform the steps of a method of routing data through a router in a communications network, the method comprising:

receiving one or more data packets, each packet having a respective destination address;

applying a lookup algorithm to each packet, said lookup algorithm being arranged to determine a respective route along which each packet is to be transmitted towards its destination address by searching an associated hierarchical data structure containing routing information for each packet; and forwarding each packet for transmission to its respective destination address, wherein said lookup algorithm comprises an adaptive learning component comprising an artificial neural network that is configured to dynamically identify an optimum starting position for searching within said hierarchical data structure, for each of the data packets, based on the results of one or more earlier searches performed by the lookup algorithm of the router by said artificial neural network evaluating search errors associated with each earlier search and dynamically updating one or more weights within said artificial neural network, wherein evaluating said search error and updating said one or more weights enables said artificial neural network to learn the approximate location at which a particular routing information is to be found within said hierarchical data structure.

\* \* \* \* \*